United States Patent
Wu et al.

(10) Patent No.: US 10,143,325 B2
(45) Date of Patent: Dec. 4, 2018

(54) METHOD AND DEVICE FOR CONTROLLING HEAT PRESERVATION FOR ELECTRONIC COOKER

(71) Applicant: Xiaomi Inc., Beijing (CN)

(72) Inventors: Ke Wu, Beijing (CN); Xinyu Liu, Beijing (CN); Jin Han, Beijing (CN)

(73) Assignee: Xiaomi Inc., Beijing (CN)

( * ) Notice: Subject to any disclaimer, the term of this patent is extended or adjusted under 35 U.S.C. 154(b) by 162 days.

(21) Appl. No.: 15/139,562

(22) Filed: Apr. 27, 2016

(65) Prior Publication Data

US 2017/0119191 A1  May 4, 2017

(30) Foreign Application Priority Data

Oct. 28, 2015  (CN) .......................... 2015 1 0711522

(51) Int. Cl.
 A23L 5/10 (2016.01)
 A47J 27/00 (2006.01)
 (Continued)

(52) U.S. Cl.
 CPC ........... *A47J 27/004* (2013.01); *A23L 1/0128* (2013.01); *A23L 3/005* (2013.01); *A23L 3/16* (2013.01);
 (Continued)

(58) Field of Classification Search
 CPC ... A23L 5/10; A23L 5/13; A23L 3/005; A23L 3/16; A47J 37/00; A47J 36/32;
 (Continued)

(56) References Cited

U.S. PATENT DOCUMENTS 6,283,014 B1 * 9/2001 Ng ....................... A47J 27/0802
 219/431
6,587,739 B1 * 7/2003 Abrams ................. G05B 15/02
 340/12.32
(Continued)

FOREIGN PATENT DOCUMENTS

CN 1281671 A 1/2001
CN 102687985 A 9/2012
(Continued)

OTHER PUBLICATIONS

Extended European Search Report issued by the European Patent Office dated Mar. 28, 2017, in counterpart European Application No. 16169701.6-1808.
(Continued)

*Primary Examiner* — Drew E Becker
(74) *Attorney, Agent, or Firm* — Finnegan, Henderson, Farabow, Garrett & Dunner LLP

(57) ABSTRACT

Provided is a method and device for an electronic cooker to control heat preservation. The method includes: acquiring holding temperature data for a food; predicting serving time point data for the food; acquiring serving temperature data for the food at a time point indicated by the serving time point data; determining time point data of terminating the heat preservation for the food in accordance with the serving time point data, the serving temperature data, and the holding temperature data; and terminating the heat preservation for the food at a time point indicated by the time point data of terminating the heat preservation.

8 Claims, 14 Drawing Sheets

(51) Int. Cl.

| | | |
|---|---|---|
| *A23L 3/16* | (2006.01) | |
| *A47J 39/02* | (2006.01) | |
| *H05B 1/02* | (2006.01) | |
| *A47J 36/24* | (2006.01) | |
| *H04W 4/02* | (2018.01) | |
| *A23L 1/01* | (2006.01) | |
| *A23L 3/005* | (2006.01) | |
| *A47J 36/32* | (2006.01) | |
| *G05B 15/02* | (2006.01) | |

(52) U.S. Cl.
CPC ............... *A23L 5/10* (2016.08); *A47J 36/24* (2013.01); *A47J 36/32* (2013.01); *A47J 39/02* (2013.01); *G05B 15/02* (2013.01); *H04W 4/02* (2013.01); *H05B 1/0225* (2013.01); *H05B 1/0258* (2013.01); *H05B 1/0261* (2013.01); *H05B 1/0263* (2013.01); *A23V 2002/00* (2013.01)

(58) Field of Classification Search
CPC .... A47J 27/004; H05B 1/0258–1/0266; H05B 1/0225; G05B 15/02; H04W 4/02; A23V 2002/00
USPC ................. 426/231–233, 523; 99/331–333
See application file for complete search history.

(56) References Cited

U.S. PATENT DOCUMENTS

| | | | | |
|---|---|---|---|---|
| 6,730,889 B1 * | 5/2004 | Jones-Lawlor | A47J 27/004 | 219/435 |
| 6,904,969 B2 * | 6/2005 | Mueller | A47J 39/006 | 165/254 |
| 7,605,349 B2 * | 10/2009 | Gaynor | A47J 27/004 | 165/47 |
| 2003/0070799 A1 * | 4/2003 | Mueller | A47J 39/006 | 165/254 |
| 2003/0173352 A1 * | 9/2003 | Patterson | A47J 27/004 | 219/494 |
| 2003/0226657 A1 * | 12/2003 | Wallace | A47J 39/003 | 165/202 |
| 2007/0032225 A1 | 2/2007 | Konicek et al. | | |
| 2008/0249840 A1 * | 10/2008 | Koether | G06Q 30/02 | 705/7.31 |
| 2008/0280000 A1 * | 11/2008 | Breunig | A21B 3/07 | 426/523 |
| 2009/0229474 A1 * | 9/2009 | Hsu | A47J 27/62 | 99/332 |
| 2010/0211468 A1 * | 8/2010 | Breunig | F24C 7/08 | 705/15 |
| 2010/0313768 A1 * | 12/2010 | Koether | A47J 27/62 | 99/325 |
| 2012/0288595 A1 * | 11/2012 | Randall | H05B 1/0266 | 426/231 |
| 2013/0236614 A1 * | 9/2013 | Schandel | A47J 27/00 | 426/231 |
| 2014/0045482 A1 | 2/2014 | Bisson et al. | | |
| 2014/0370167 A1 * | 12/2014 | Garden | G06Q 50/12 | 426/233 |
| 2015/0064314 A1 * | 3/2015 | Manuel | A47J 36/32 | 426/231 |
| 2016/0171591 A1 * | 6/2016 | Williams | G06Q 30/0635 | 705/26.81 |
| 2016/0315784 A1 | 10/2016 | Wu et al. | | |

FOREIGN PATENT DOCUMENTS

| | | |
|---|---|---|
| CN | 104345752 A | 2/2015 |
| CN | 104898613 A | 9/2015 |
| CN | 104977867 A | 10/2015 |
| EP | 3089403 A2 | 11/2016 |
| JP | 2000-14541 | 1/2000 |
| JP | 2002267487 A | 9/2002 |
| JP | 2004-162937 A | 6/2004 |
| JP | 2004-313571 A | 11/2004 |
| JP | 2006-149601 A | 6/2006 |
| JP | 2008-405 A | 1/2008 |
| JP | 2009-19797 A | 1/2009 |
| JP | 2012000267 A | 1/2012 |
| JP | 2015-8804 A | 1/2015 |
| WO | WO 2015/029333 A1 | 3/2015 |

OTHER PUBLICATIONS

International Search Report and Written Opinion issued by the State Intellectual Property Office of the People's Republic of China (SIPO) dated Jul. 26, 2016, in counterpart International Application No. PCT/CN2015/099048.

English translation of the International Search Report issued by the SIPO dated Jul. 26, 2016, in counterpart International Application No. PCT/CN2015/099048.

Notification of Reasons for Refusal issued by the Japanese Patent Office dated Jan. 23, 2018, in counterpart to Japanese Application No. 2016-545323.

* cited by examiner

METHOD AND DEVICE FOR CONTROLLING HEAT PRESERVATION FOR ELECTRONIC COOKER

CROSS-REFERENCE TO RELATED APPLICATIONS

This application is based upon and claims a priority to Chinese Patent Application No. 201510711522.7, filed on Oct. 28, 2015, the entire content of which is incorporated herein by reference.

TECHNICAL FIELD

The present disclosure generally relates to the field of cooking technology, and more particularly, to a method and device for controlling heat preservation for an electronic cooker.

BACKGROUND

An electronic cooker is a household appliance which has been broadly applied and provides a convenient service for people's daily live. In the related art, a working process of the electronic cooker includes a cooking process and a heat preservation process. The cooking process includes subjecting raw food material to a heating process, which turns the raw food material into a cooked food. The heat preservation process includes subjecting the cooked food to heat preservation. After completing the cooking process, the electronic cooker will initiate the heat preservation for the cooked food for a preset time period followed by automatically power-off to terminate the heat preservation.

SUMMARY

According to a first aspect of embodiments of the present disclosure, there is provided a method for controlling heat preservation for an electronic cooker. The method includes: acquiring holding temperature data for a food; predicting serving time point data for the food; acquiring serving temperature data for the food at a time point indicated by the serving time point data; determining time point data of terminating the heat preservation for the food in accordance with the serving time point data, the serving temperature data and the holding temperature data; and terminating the heat preservation for the food at a time point indicated by the time point data of terminating the heat preservation.

According to a second aspect of embodiments of the present disclosure, there is provided a device for controlling heat preservation for an electronic cooker. The device includes a processor and a memory for storing instructions executable by the processor. The processor is configured to: acquire holding temperature data for a food; predict serving time point data for the food; acquire serving temperature data for the food at a time point indicated by the serving time point data; determine time point data of terminating the heat preservation for the food in accordance with the serving time point data, the serving temperature data, and the holding temperature data; and terminate the heat preservation for the food at a time point indicated by the time point data of terminating the heat preservation.

According to a third aspect of embodiments of the present disclosure, there is provided a non-transitory computer-readable storage medium having stored therein instructions that, when executed by a processor of an apparatus, cause the apparatus to perform a method for controlling heat preservation for an electronic cooker. The method includes: acquiring holding temperature data for a food; predicting serving time point data for the food; acquiring serving temperature data for the food at a time point indicated by the serving time point data; determining time point data of terminating the heat preservation for the food in accordance with the serving time point data, the serving temperature data and the holding temperature data; and terminating the heat preservation for the food at a time point indicated by the time point data of terminating the heat preservation.

It is to be understood that both the foregoing general description and the following detailed description are illustrative and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1-2 is a flow chart showing a method for controlling heat preservation for an electronic cooker according to an illustrative embodiment.

FIG. 2-1 is a flow chart showing another method for controlling heat preservation for an electronic cooker according to an illustrative embodiment.

FIG. 2-2 is a flow chart of predicting holding temperature data for a food according to an illustrative embodiment.

FIG. 2-3 is a flow chart of predicting serving time point data for a food according to an illustrative embodiment.

FIG. 2-4 is a flow chart of acquiring information on a route along which a user travels back to a residence according to an illustrative embodiment.

FIG. 2-5 is a flow chart of predicting serving temperature data for a food according to an illustrative embodiment.

FIG. 2-6 is a flow chart of determining time point data of terminating heat preservation for a food according to an illustrative embodiment.

FIG. 2-7 is a curve chart showing time point data and temperature data from cooking to being served for rice according to an illustrative embodiment.

FIG. 3-1 is a block diagram showing a device for controlling heat preservation for an electronic cooker according to an illustrative embodiment.

FIG. 3-2 is a block diagram showing another device for controlling heat preservation for an electronic cooker according to an illustrative embodiment.

FIG. 3-3 is a block diagram showing a further device for controlling heat preservation for an electronic cooker according to an illustrative embodiment.

FIG. 3-4 is a block diagram showing a serving time point predicting module according to an illustrative embodiment.

FIG. 4 is a block diagram showing a device for controlling heat preservation for an electronic cooker according to an illustrative embodiment.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Figure 1:
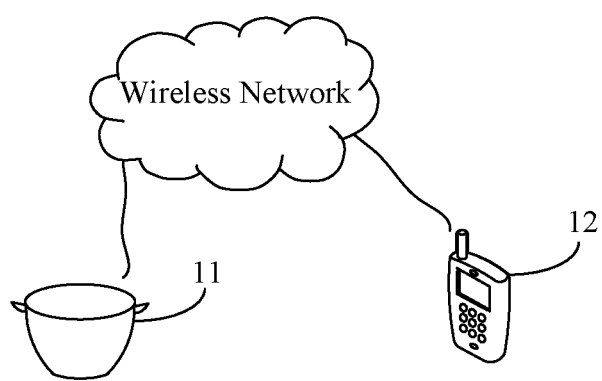
FIG. 1-1 is a schematic diagram showing an implementation environment involved in a method for controlling heat preservation for an electronic cooker provided by various embodiments of the present disclosure.

FIG. 1-1 is a schematic diagram showing an implementation environment involved in a method for controlling heat preservation for an electronic cooker provided by various embodiments of the present disclosure. The implementation environment may include an electronic cooker 11 and a terminal 12.

The electronic cooker 11 may establish a wireless communication with the terminal 12. The electronic cooker 11 may receive information on a route along which a user travels back to a residence, information on a transportation mode by which the user travels back to the residence, information on a traffic condition of the route along which the user travels back to the residence and so on, which are sent from the terminal 12, such that the electronic cooker 11 may be capable of predicting timing point data when the user arrives at the residence, thereby determining serving timing point data for serving the food. At the same time, the electronic cooker 11 may further receive information on a current position of the user and information on a position of the residence of the user, which are sent from the terminal 12.

The terminal 12 may be a mobile phone, a tablet computer, a laptop, and a desktop, and so on. An application client for controlling the electronic cooker 11 may be installed in the terminal 12, so as to facilitate the communication between the electronic cooker 11 and the terminal 12.

Figures 1, 2:
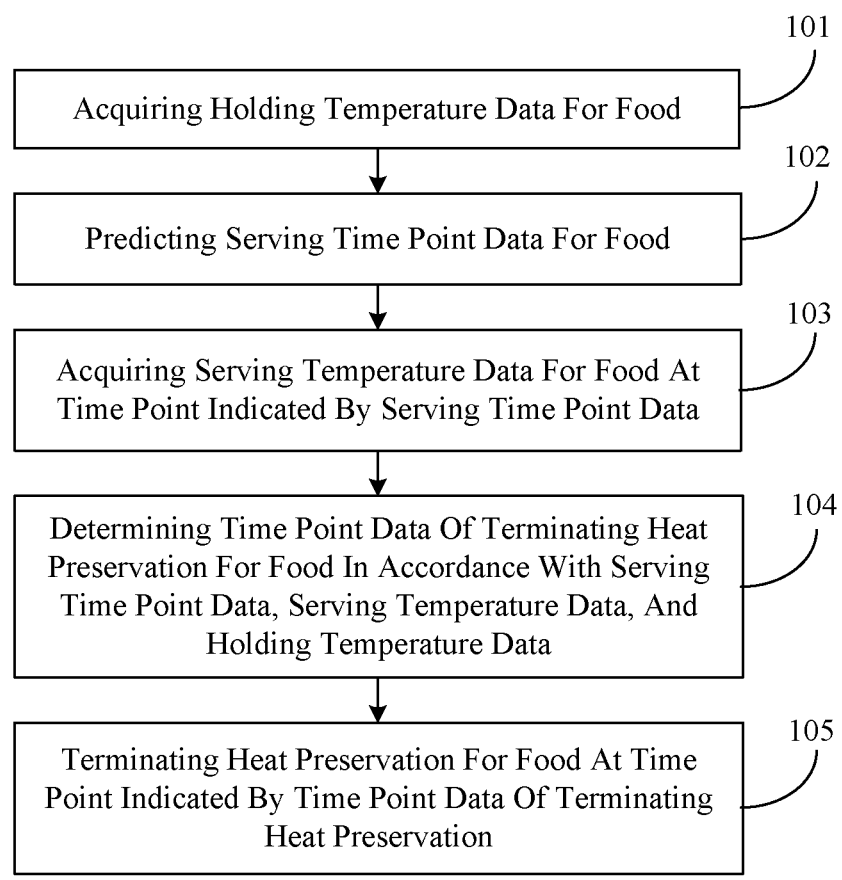

FIG. 1-2 is a flow chart showing a method for controlling heat preservation for an electronic cooker according to an illustrative embodiment. The method for controlling the heat preservation for the electronic cooker may include the following steps.

In step 101, holding temperature data for a food is acquired.

In step 102, serving time point data for the food is predicted.

In step 103, serving temperature data for the food at a time point indicated by the serving time point data is acquired.

In step 104, time point data of terminating the heat preservation for the food is determined in accordance with the serving time point data, the serving temperature data, and the holding temperature data.

In step 105, the heat preservation for the food is terminated at a time point indicated by the time point data of terminating the heat preservation.

The above-described method for controlling the heat preservation for the electronic cooker provided by embodiments of the present disclosure determines the time point data of terminating the heat preservation for the food in accordance with the serving time point data, the serving temperature data, and the holding temperature data, such that the electronic cooker may be capable of determining the time point of terminating the heat preservation after finishing cooking, thereby enhancing flexibility in controlling the heat preservation as compared with the related art. In the related art, the flexibility in controlling the heat preservation is relative low, because the electronic cooker in the related art terminates the heat preservation for the food after a predetermined time period. As the temperature of the food gradually decreases after the heat preservation is terminated, an undesired serving temperature of a finally-obtained food for a user may be resulted by the electronic cooker in the related art.

FIG. 2-1 is a flow chart showing another method for controlling heat preservation for an electronic cooker according to an illustrative embodiment. The method for controlling the preservation, for use in the electronic cooker, includes the following steps.

In step 201, holding temperature data for a food is acquired.

In exemplary embodiments, the holding temperature data for the food may be acquired in accordance with a food name, as the holding temperature data for the food depends on properties of the materials of the food. For example, rice is of an optimal taste at a temperature of 65 degrees Celsius; as a result, the holding temperature data for the rice may be at 65 degrees Celsius. As another example, milk is of an optimal taste at a temperature of 60 degrees Celsius to 70 degrees Celsius; as a result, the holding temperature data for the milk may be at 60 degrees Celsius to 70 degrees Celsius. As still another example, homemade yoghourt is of an optimal taste at a temperature of 35 degrees Celsius to 45 degrees Celsius; as a result, the holding temperature data for the yoghourt may be at 35 degrees Celsius to 45 degrees Celsius. As a further example, soups (such as a rib soup) are of an optimal taste at a temperature of 60 degrees Celsius to 70 degrees Celsius; as a result, the holding temperature data for the rib soup may be at 60 degrees Celsius to 70 degrees Celsius. The temperature data is used to indicate a temperature. For example, if the temperature data is 70 degrees Celsius, the temperature is 70 degrees Celsius.

It should be noted that a temperature at a time point indicated by time point data of initiating the heat preservation for the food and a temperature at a time point indicated by time point data of terminating the heat preservation for the food are very close to each other in practical applications, and therefore in embodiments of the present disclosure, the temperature data at the time point indicated by the time point data of initiating the heat preservation for the food and the temperature data at the time point indicated by the time point data of terminating the heat preservation for the food are collectively referred to as the holding temperature data for the food.

In exemplary embodiments, as shown in FIG. 2-2, step 201 may include the following three sub-steps.

In sub-step 2011, a name inputting instruction is received.

The name inputting instruction is used for indicating a food name. For example, in the case that the electronic cooker executes the heat preservation for rice, the holding temperature data for the rice may be acquired in accordance with a rice inputting instruction received. As another example, in the case that the electronic cooker executes the heat preservation for milk, the holding temperature data for the milk may be acquired in accordance a milk inputting instruction received.

In sub-step 2012, target holding temperature data corresponding to the food name indicated by the name inputting instruction is determined in accordance with the name inputting instruction and a preset holding temperature correspondence.

The holding temperature correspondence is used for recording information on a correspondence between food names and holding temperatures for the foods. Table 1 shows exemplary correspondence between four food names and their holding temperatures. As shown in Table 1, the holding temperature for the rice is at 65 degrees Celsius; the holding temperature for the rib soup is at 60 degrees Celsius to 70 degrees Celsius; the holding temperature for the milk is at 60 degrees Celsius to 70 degrees Celsius; and the holding temperature for the yoghourt is at 35 degrees Celsius to 45 degrees Celsius. For example, if a current name inputting instruction indicates the rice, then it may be determined that the target holding temperature data corresponding to the rice is 65 degrees Celsius in accordance with the name inputting instruction and Table 1. As another example, if a current name inputting instruction indicates the milk, then it may be determined that the target holding temperature data corresponding to the milk is 60 degrees Celsius to 70 degrees Celsius in accordance with the name inputting instruction and Table 1.

TABLE 1

| Food name | Holding temperature for food |
|---|---|
| Rice | 65 degrees Celsius |
| Rib soup | 60 degrees Celsius-70 degrees Celsius |
| Milk | 60 degrees Celsius-70 degrees Celsius |
| Yoghourt | 35 degrees Celsius-45 degrees Celsius |

In sub-step 2013, the target holding temperature data is taken as the holding temperature data.

After sub-step 2012, the target holding temperature data determined in sub-step 2012 may be taken as the holding temperature data. For example, if the target holding temperature data corresponding to the rib soup determined in sub-step 2012 is 60 degrees Celsius to 70 degrees Celsius, then the temperature of 60 degrees Celsius to 70 degrees Celsius may be taken as the holding temperature data for the rib soup.

In step 202, time point data of terminating cooking for the food and temperature data of terminating cooking for the food at a time point indicated by the time point data of terminating cooking are acquired.

In exemplary embodiments, the time point data of terminating cooking for the food and temperature data of terminating cooking for the food at the time point indicated by the time point data of terminating cooking may be determined in accordance with preset time point data and preset temperature data. For example, the time point data of terminating cooking for the food and temperature data of terminating cooking for the food at the time point indicated by the time point data of terminating cooking may be obtained by reading a cooking program currently executed by the electronic cooker. It should be noted that time point data is used for indicating a time point, for example, the time point data of terminating cooking is used for indicating a time point of terminating cooking.

In step 203, time point data of initiating the heat preservation for the food is determined in accordance with the time point data of terminating cooking, the temperature data of terminating cooking, and the holding temperature data.

In exemplary embodiments, step 203 may include: determining a time period from the time point indicated by the time point data of terminating cooking for the food to the time point indicated by the time point data of initiating the heat preservation for the food in accordance with the temperature data of terminating cooking and the holding temperature data; and taking a sum of the time point indicated by the time point data of terminating cooking for the food and the time period as the time point data of initiating the heat preservation for the food. Specific details for determining the time period from the time point indicated by the time point data of terminating cooking for the food to the time point indicated by the time point data of initiating the heat preservation for the food in accordance with the temperature data of terminating cooking and the holding temperature data may be obtained by referring to the related art, which is not elaborated by embodiments of the present disclosure.

In step 204, serving time point data for the food is predicted.

The serving time point data for the food refers to time point data when the food is served by a user. It is assumed that the user is on his/her way back to a residence at a current moment. In one embodiment, in order to enable the user to able to eat a tasty food right after arriving at the residence, time point data when the user is predicted to arrive at the residence may be taken as the serving time point data. For example, it is predicted that the time point data when the user arrives at the residence is at 18:20, 18:20 may be taken as the serving time point data for the food. In another embodiment, delayed time point data which is after a predetermined time period from the time point indicated by the time point data when the user is predicted to arrive at the residence, may be taken as the serving time point data for the food. For example, it is predicted that the time point data when the user arrives at the residence is at 18:20, 18:30 may be taken as the serving time point data for the food, with 10 minutes reserved as an interval for short rest or preparation work prior to eating the food.

Step 204 may be executed in various ways. In one embodiment, step 204 may include: predicting the serving time point data in accordance with information on a historical serving record. The information on the historical serving record includes a time point of opening the electronic cooker after each time point of terminating cooking recorded in advance. According to embodiments of the present disclosure, time point data of opening the electronic cooker after each time point of terminating cooking is taken as the serving time point data for the food, such that the serving time point data for the food is predicted by means of reading the information on the historical serving record of the user. It should be noted that the information on the historical serving record includes a time point of opening the electronic cooker corresponding to a current time period. In the case that a time point to be currently predicted is the serving time point data for a dinner, then the information on the historical serving record includes a time point of opening the electronic cooker after each time point of terminating cooking for the dinner recorded in advance, other than that for a breakfast or lunch. In the case that a time point to be predicted currently is the serving time point data for a lunch, then the information on the historical serving record includes a time point of opening the electronic cooker after each time point of terminating cooking for the lunch recorded in advance, other than that for a breakfast or dinner. Since the information on the historical serving record includes all time points of opening the electronic cooker after every time point of terminating cooking for the food recorded in advance, an average of multiple time points of opening the electronic cooker after every time point of terminating cooking for the food may be taken as the serving time point data for the food. Other predicting algorithm may also be used to predict the serving time point data for the food, which is not limited herein by embodiments of the present disclosure. For example, Table 2 is a diagram showing information on a historical serving record. As shown in Table 2, the information on the historical serving record includes time points of opening the electronic cooker after each time point of terminating cooking for the dinner every evening from October $1^{st}$ to $5^{th}$, i.e., the serving time point data for the food every evening. As can be seen from Table 2, a time point of opening the electronic cooker after the time point of terminating cooking for the dinner in the evening of $1^{st}$ of October is 18:40; a time point of opening the electronic cooker after the time point of terminating cooking for the dinner in the evening of $3^{rd}$ of October is 18:25. Accordingly, it may be calculated that an average of the five time points of opening the electronic cooker after the time point of terminating cooking for the dinner in every evening from $1^{st}$ to $5^{th}$ of October is 18:35, so that the serving time point data in the current date may be predicted as 18:35.

TABLE 2

| Date | Time points of opening the electronic cooker after the time point of terminating cooking |
|---|---|
| October $1^{st}$ | 18:40 |
| October $2^{nd}$ | 18:30 |
| October $3^{rd}$ | 18:25 |
| October $4^{th}$ | 18:30 |
| October $5^{th}$ | 18:50 |

In one embodiment, step 204 may include: taking a time point in a current date that corresponds to the time point of opening the electronic cooker after the last time point of terminating cooking as the serving time point data. It should be noted that the time point of opening the electronic cooker after the last time point of terminating cooking corresponds to a current time period. In the case that a time point to be currently predicted is the serving time point data for a dinner, then the time point of opening the electronic cooker after the last time point of terminating cooking refers to the time point of opening the electronic cooker after the time point of terminating cooking for the dinner last time. For example, if the current date is October $6^{th}$, and a time point of opening the electronic cooker after the time point of terminating cooking for the dinner last time (i.e., October $5^{th}$) is at 18:50, then 18:50 on October $6^{th}$ may be taken as the serving time point data for the dinner.

Figures 1, 2:
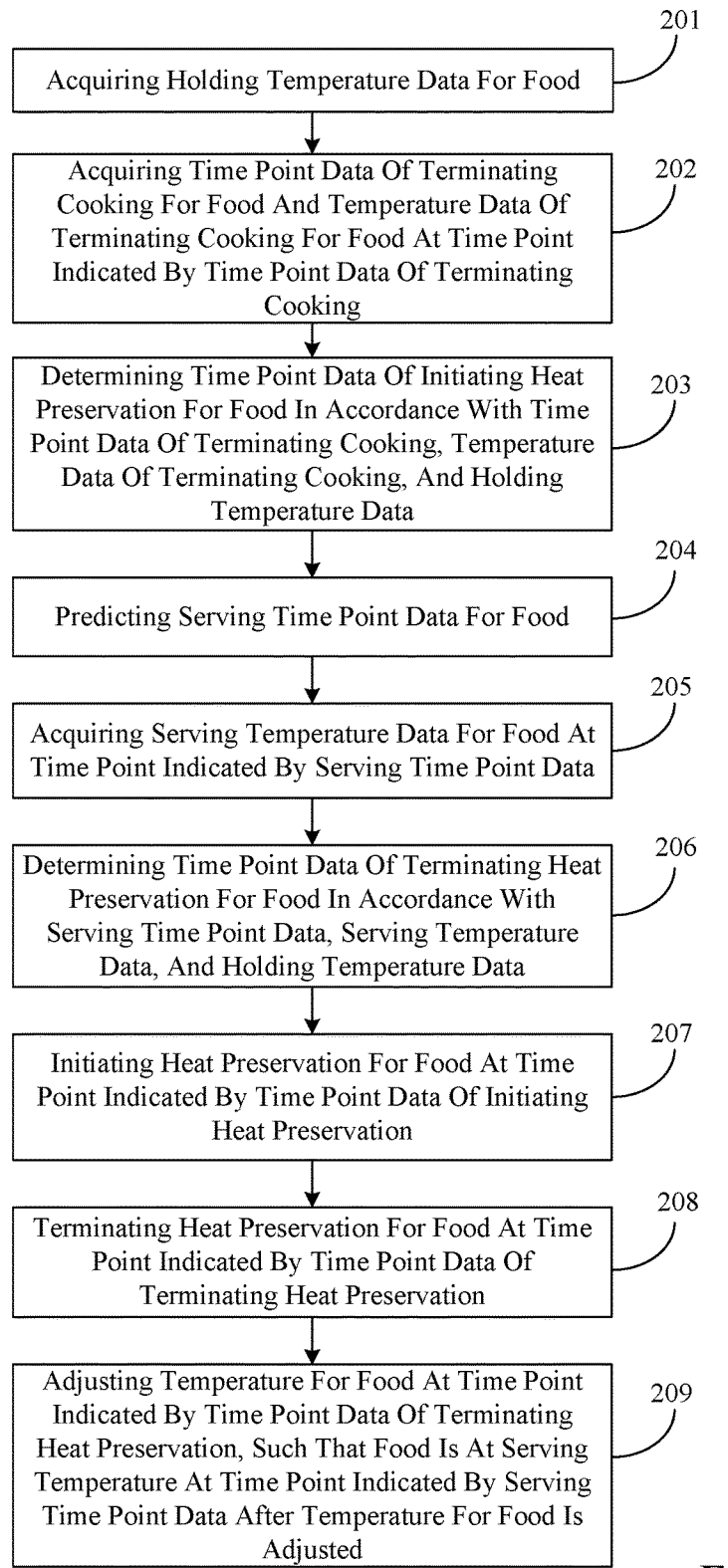
Figure 2:
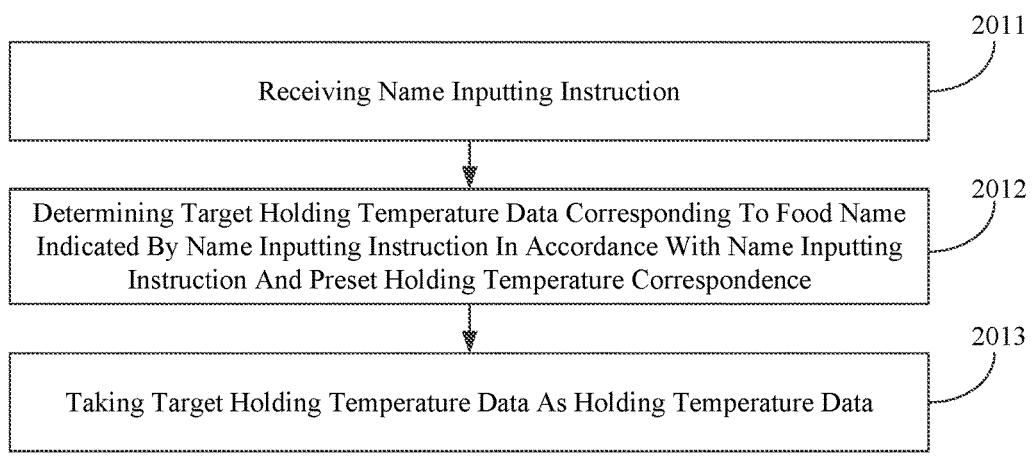
Figures 2, 3:
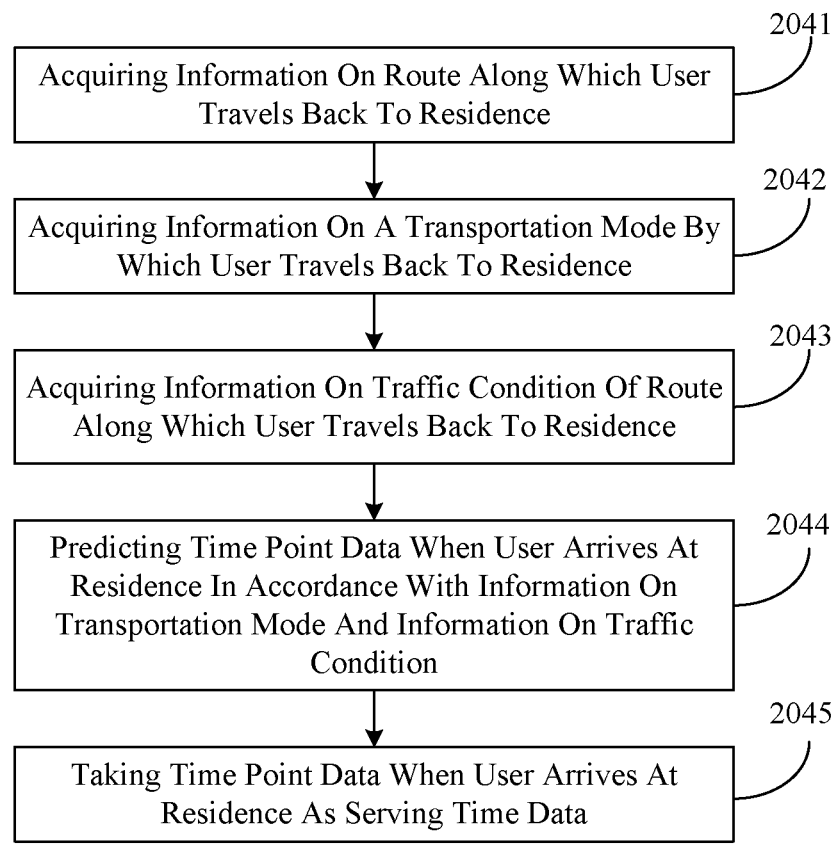

In one embodiment, as shown in FIG. 2-3, step 204 may include the following five sub-steps.

In sub-step 2041, information on a route along which a user travels back to a residence is acquired.

The residence is a place where the electronic cooker is located. The information on the route along which the user travels back to the residence includes information on the route from a starting point to a destination, in which the starting point refers to a current position of the user and a destination refers to the residence of the user. With the same transportation mode, the user may arrive at the residence later when the route along which the user travels back to the residence is longer; and the user may arrive at the residence earlier when the route along which the user travels back to the residence is shorter. As a result, the route along which the user travels back to the residence influences the time point data when the user arrives at the residence. The information on the route may be route information stored in the electronic cooker in advance. For example, as the information on the route along which the user travels back to the residence from a company after work is generally constant every day, this route information may be stored in the electronic cooker in advance. Alternatively, the information on the route may be real-time route information sent from a terminal at a user side, or route information determined by the electronic cooker in accordance with the information on the current position of the user and the information on the position of the residence of the user.

In sub-step 2042, information on a transportation mode by which the user travels back to the residence is acquired.

The user may travel back to the residence by various transportation modes, such as walking, riding a bike, taking a bus, and driving a car. The user may travel back to the residence by walking, riding a bike, taking a bus, or driving a car, which is not limited herein by embodiments of the present disclosure. For the same route along which the user travels back to the residence, the user may take much longer time to arrive at the residence by taking the bus than driving the car. Accordingly, the transportation mode by which the user travels back to the residence influences the time point data when the user arrives at the residence. The information on the transportation mode may be stored in the electronic cooker in advance, or sent from the terminal at the user side.

In sub-step 2043, information on a traffic condition of the route along which the user travels back to the residence is acquired.

In exemplary embodiments, the user may arrive at the residence earlier in the case that the traffic condition of the route along which the user travels back to the residence is light; and the user may arrive at the residence later in the case that the traffic condition of the route along which the user travels back to the residence is heavy. As a result, the information on the traffic condition of the route along which the user travels back to the residence should be monitored in real-time, so as to better predict the time point data when the user arrives at the residence. The information on the traffic condition may be sent from the terminal at the user side, which monitors the traffic condition of the route along which the user travels back to the residence in real-time and sends the information on the traffic condition to the electronic cooker. For example, the terminal may monitor the traffic condition of the route along which the user travels back to the residence in real-time through a navigator application.

In sub-step 2044, time point data when the user arrives at the residence is predicted in accordance with the information on the transportation mode and the information on the traffic condition.

In exemplary embodiments, the time point data when the user arrives at the residence in the case that the traffic condition is light may be acquired in accordance with the information on the transportation mode by which the user travels back to the residence. In the case that the current traffic condition is heavy, a time period for being stuck in traffic may be predicted, and time point data which is after the time period from the time point indicated by the time point data when the user arrives at the residence when the traffic condition is light, is taken as the time point data when the user arrives at the residence when the traffic condition is heavy.

In sub-step 2045, the time point data when the user arrives at the residence is taken as the serving time point data.

After the time point data when the user arrives at the residence is predicted, such time point data of arriving at the residence may be taken as the serving time point data. Of course, the time point data which is after a preset time period from the time point indicated by the time point data when the user is predicted to arrive at the residence may also be taken as the serving time point data, such that the user may take a short rest or make preparation work prior to eating the food.

Figures 2, 3, 4:
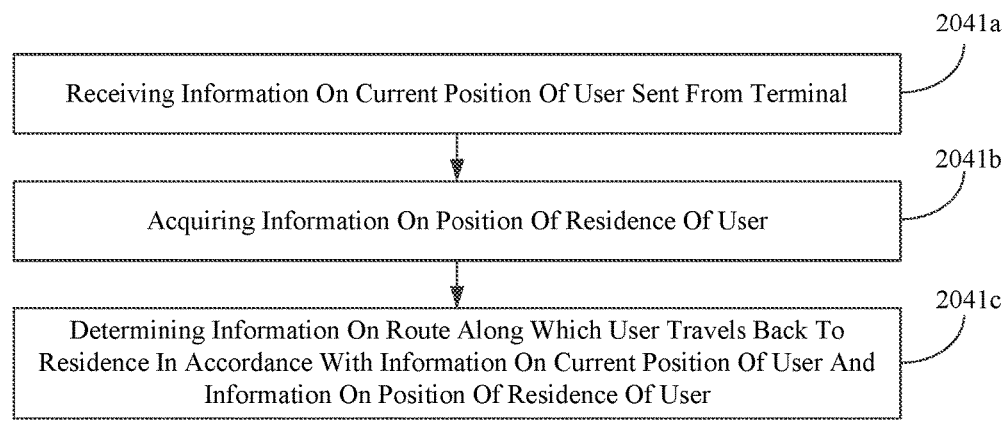
Figures 2, 3, 4, 5:
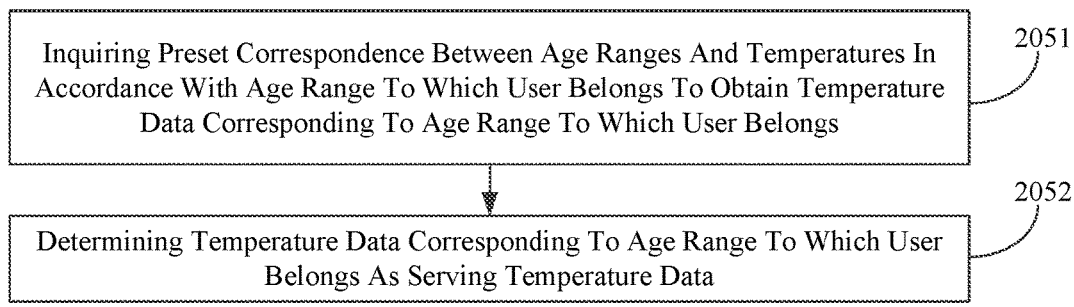
Figures 2, 3, 4, 5, 6:
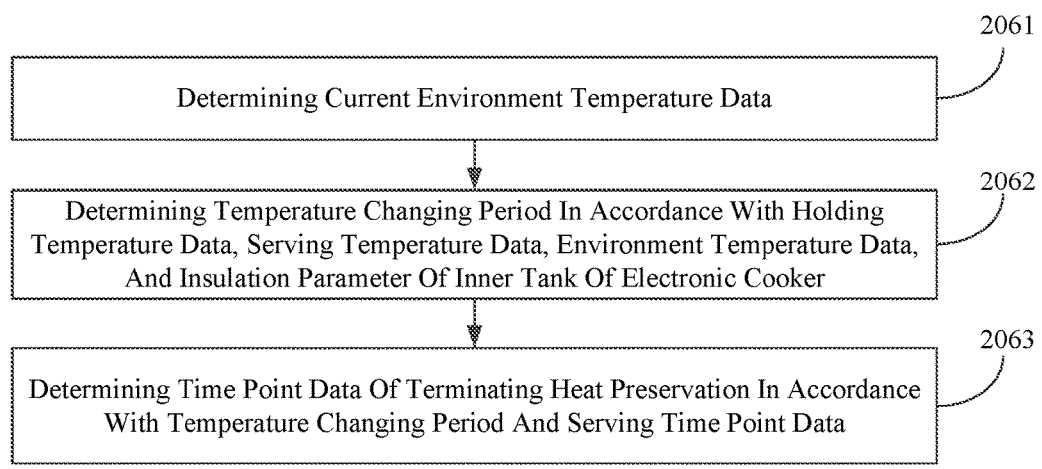
Figures 2, 3, 4, 5, 6, 7:
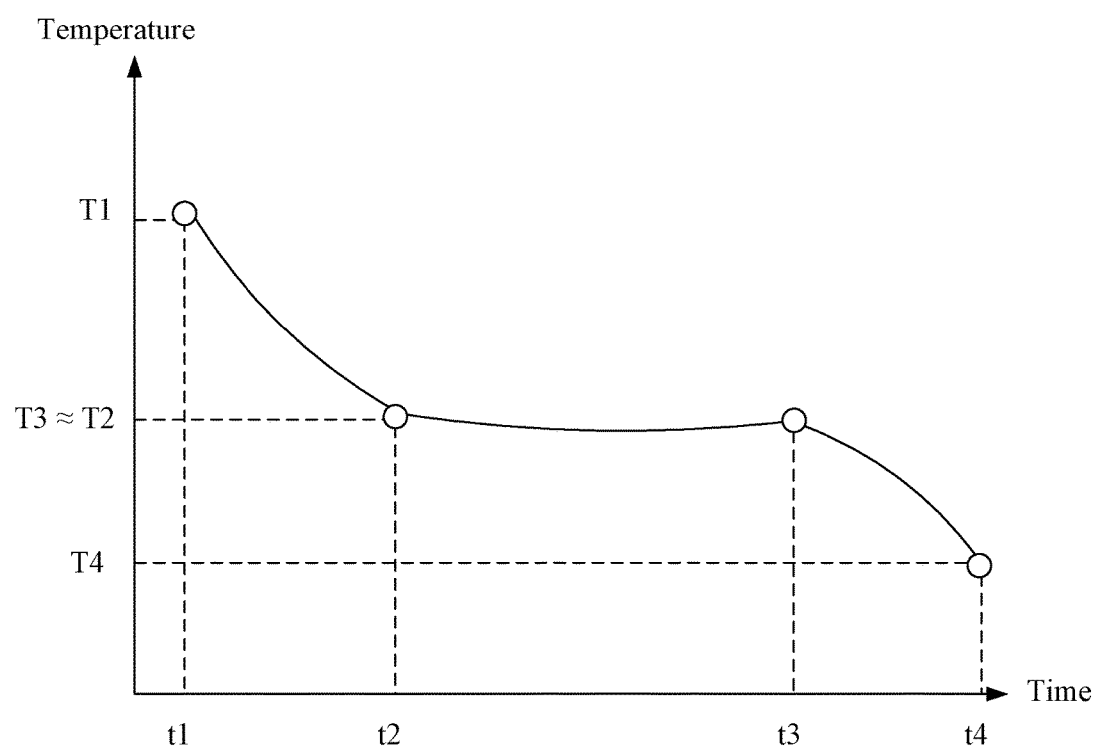
Figures 1, 3:
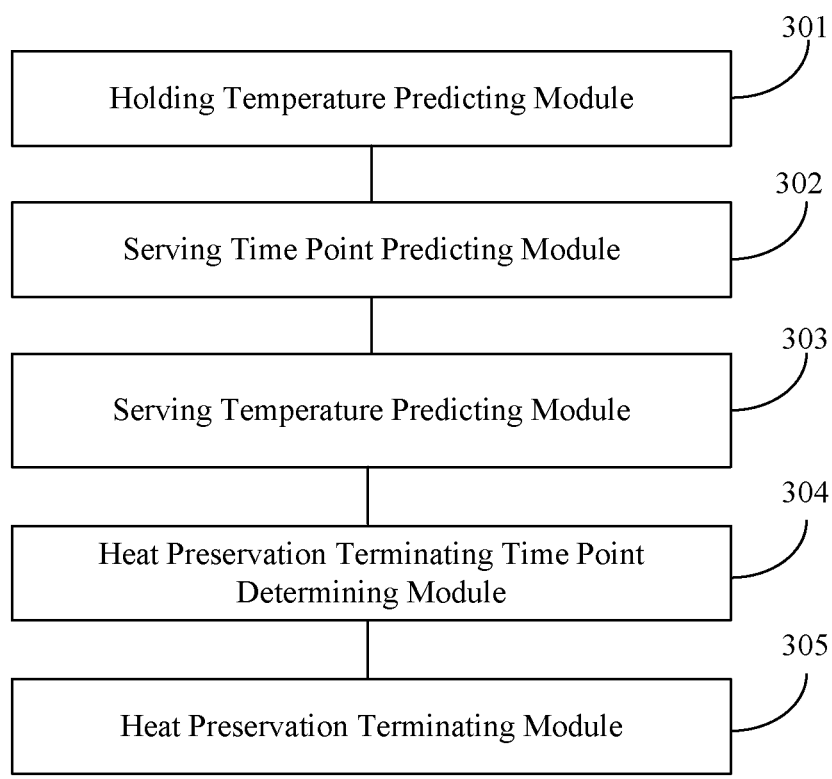
Figures 2, 3:
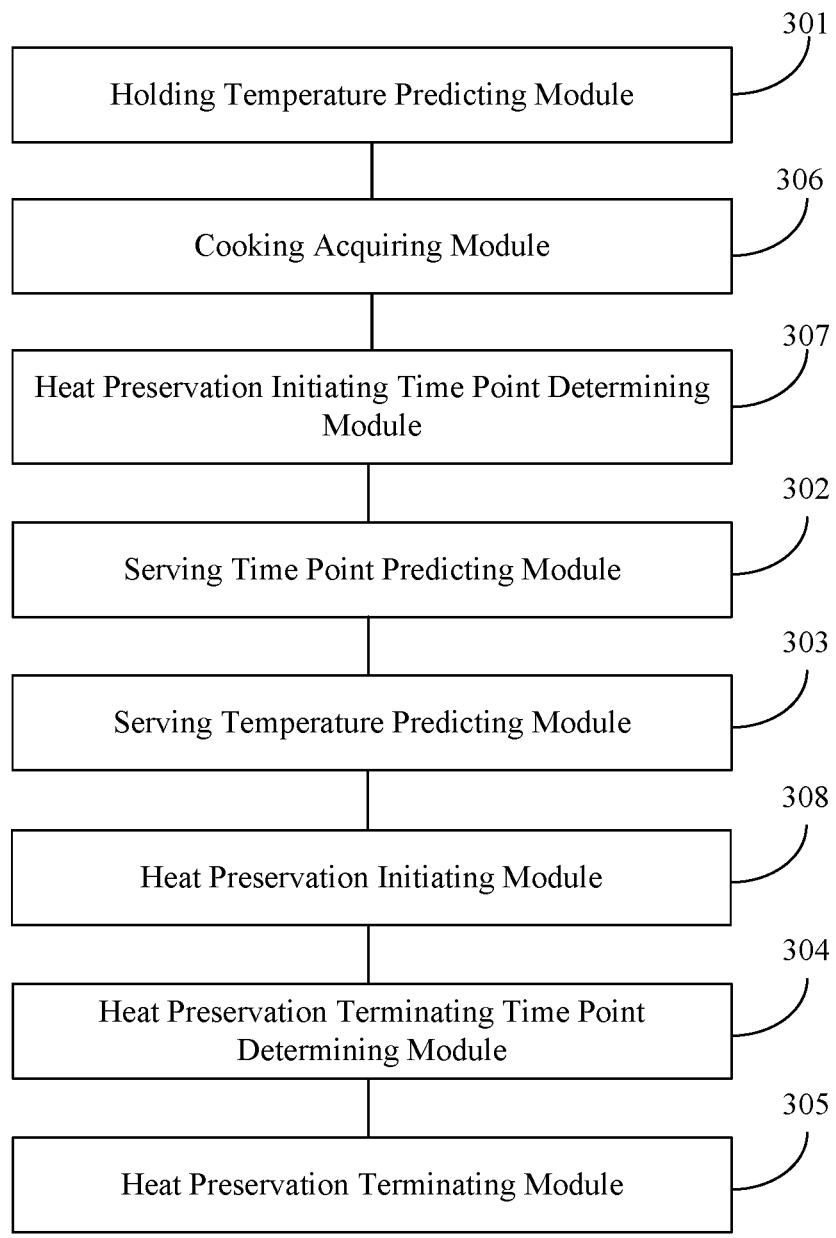
Figure 3:
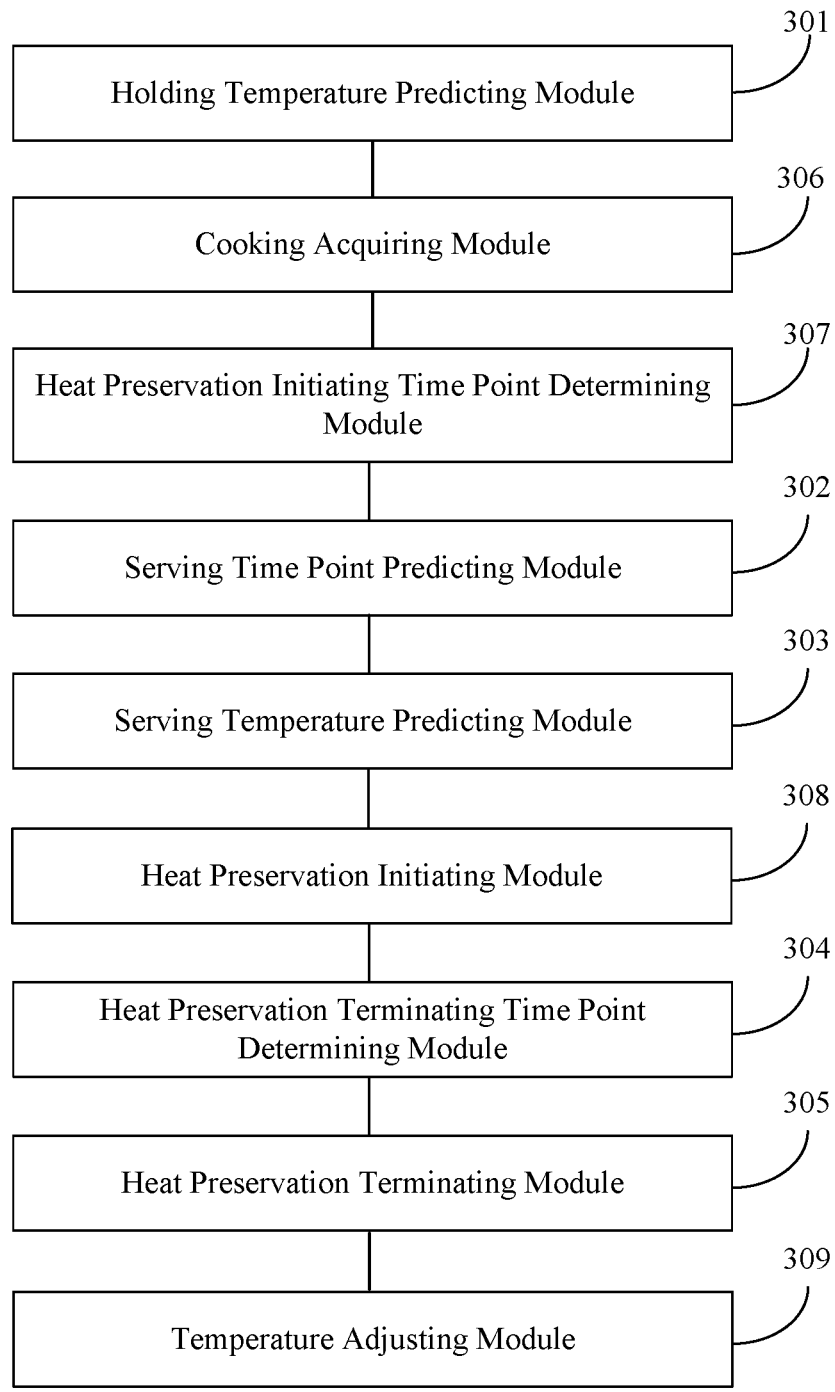
Figures 3, 4:
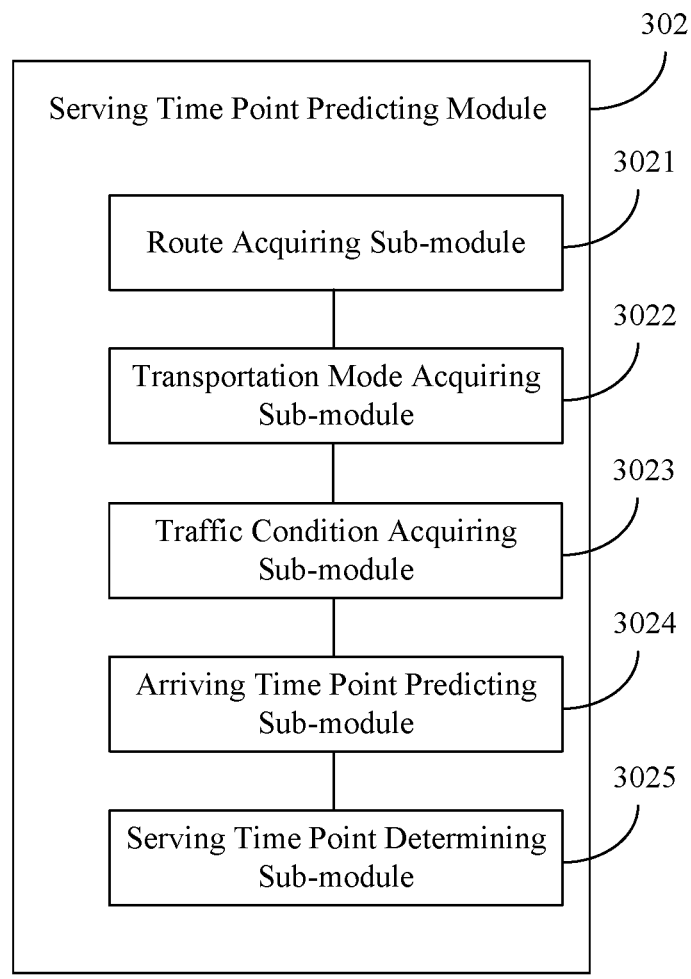
Figure 4:
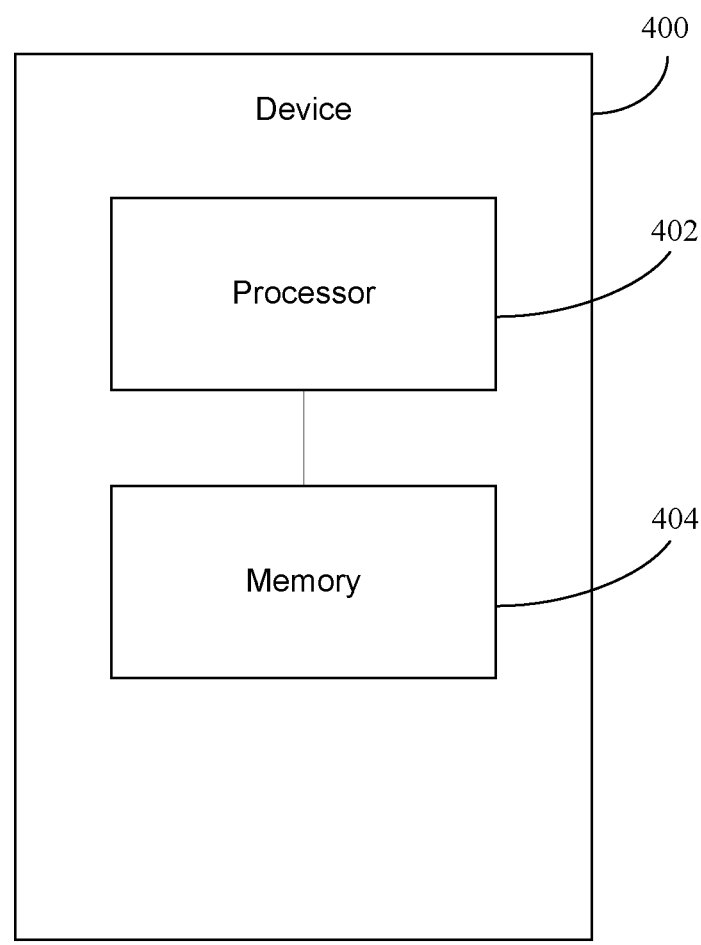

In one embodiment, as shown in FIG. 2-4, sub-step 2041 may include the following sub-steps.

In sub-step 2041a, information on a current position of the user sent from a terminal is received.

For example, the terminal may locate the current position of the user, and send the current position of the user to the electronic cooker. In exemplary embodiments, the terminal may locate the current position of the user through a global positioning system (GPS).

In sub-step 2014b, information on a position of the residence of the user is acquired.

In exemplary embodiments, the position of the residence of the user may be obtained by locating the position of the residence of the user by the electronic cooker, or obtained by locating the position of the residence of the user by the terminal and sending the information on the position of the residence to the electronic cooker, such that the electronic cooker may acquire the information on the position of the residence of the user.

In sub-step 2041c, the information on the route along which the user travels back to the residence is determined in accordance with the information on the current position of the user and the information on the position of the residence of the user.

In one embodiment, the electronic cooker may determine the information on the route along which the user travels back to the residence in accordance with the information on the current position of the user and the information on the position of the residence of the user. In another embodiment, the electronic cooker may send the information on the current position of the user and the information on the position of the residence of the user to a web server, which determines the information on the route along which the user travels back to the residence in accordance with the information on the current position of the user and the information on the position of the residence of the user, and then sends the determined information on the route along which the user travels back to the residence to the electronic cooker. In still another embodiment, the terminal may determine the information on the route along which the user travels back to the residence in accordance with the information on the current position of the user and the information on the position of the residence of the user through a navigation application, and send the information on the route along which the user travels back to the residence to the electronic cooker.

In step 205, serving temperature data for the food at a time point indicated by the serving time point data is acquired.

In order to adjust a temperature of the food at the time point indicated by the time point data of terminating the heat preservation, such that the food is at the serving temperature at the time point indicated by the serving time point data and the user can eat the food directly, the serving temperature data at the time point indicated by the serving time point data for the food is acquired.

Step 205 may be executed in various ways. In one embodiment, step 205 may include: taking serving temperature data for the food at a time point of opening the electronic cooker after the last time point of terminating cooking as the serving temperature data. For example, if the serving temperature data for the rice at a time point of opening the electronic cooker after the last time point of terminating cooking is 60 degrees Celsius, then 60 degrees Celsius may be taken as current serving temperature data for the rice.

In one embodiment, step 205 may include: taking preset recommended temperature data for the food as the serving temperature data. For example, a recommended temperature for the rice is 60 degrees Celsius, then 60 degrees Celsius may be taken as current serving temperature data for the rice. As another example, a recommended temperature for the rib soup is 75 degrees Celsius, then 75 degrees Celsius may be taken as current serving temperature data for the rib soup.

In one embodiment, as shown in FIG. 2-5, the step 205 may include the followings.

In sub-step 2051, a preset correspondence between age ranges and temperatures is inquired in accordance with an age range to which the user belongs, to obtain temperature data corresponding to the age range to which the user belongs.

Table 3 shows an exemplary correspondence between different age ranges and temperatures when eating the same food. As shown in Table 3, if the user is 35 years old, then 20 to 40 years old is the age range to which the user belongs. Thus, based on Table 3, the temperature data corresponding to the age range of 20 to 40 years old to which the user belongs is 65 degrees Celsius.

TABLE 3

| Age range | Temperature |
| --- | --- |
| 10-20 years old | 55 degrees Celsius |
| 20-40 years old | 65 degrees Celsius |
| 40-60 years old | 60 degrees Celsius |
| 60-80 year old | 55 degrees Celsius |
| 80 years old or more | 50 degrees Celsius |

In sub-step 2052, the temperature data corresponding to the age range to which the user belongs is determined as the serving temperature data.

In the above example, it is assumed that the user is 35 years old, and 20 to 40 years old is the age range to which the user belongs. Then, by inquiring Table 3, the temperature data corresponding to the age range to which the user belongs is 65 degrees Celsius. Thus, 65 degrees Celsius may be determined as the serving temperature data for the food.

In step 206, time point data of terminating the heat preservation for the food is determined in accordance with the serving time point data, the serving temperature data, and the holding temperature data.

The time point data of terminating the heat preservation for the food is determined in accordance with the serving time point data for the food predicted in step 204, the serving temperature data at the time point indicated by the serving time point data for the food acquired in step 205, and the holding temperature data for the food acquired in step 201, so as to terminate the heat preservation for the food at the time point indicated by the time point data of terminating the heat preservation.

As shown in FIG. 2-6, step 206 may include the following three sub-steps.

In sub-step 2061, current environment temperature data is determined.

The environment temperature data is used to reflect a degree of coldness or the hotness for the environment. In order to determine a difference between the time point indicated by the serving time point data for the food and the time point indicated by the time point data of terminating the heat preservation, the current environment temperature data may be determined at first.

In sub-step 2062, a temperature changing period is determined in accordance with the holding temperature data, the serving temperature data, the environment temperature data, and an insulation parameter of an inner tank of the electronic cooker.

The temperature changing period is a difference between the time point indicated by the serving time point data and the time point indicated by the time point data of terminating the heat preservation. The inner tank of the electronic cooker is of an insulation parameter indicating a heat transfer rate. Illustratively, in the case that the holding temperature for the food is higher than the serving temperature at the serving time point for the food, the temperature changing period may be determined with a heat transfer formula in accordance with the holding temperature data, the serving temperature data, the environment temperature data and a heat transfer rate of the inner tank of the electronic cooker. The heat transfer formula is $$\Delta t = \frac{Q * \sigma}{\lambda * A * (T2 - T4)},$$

in which $\Delta t$ represents the temperature changing period, Q is a heat dissipating capacity of the inner tank, $\sigma$ is a thickness of the inner tank, $\lambda$ is the heat transfer rate of the inner tank, A is an area where the food is in contact with the inner tank, T2 is the holding temperature for the food, and T4 is the serving temperature at the serving time point for the food.

In sub-step 2063, the time point data of terminating the heat preservation is determined in accordance with the temperature changing period and the serving time point data.

The difference between the serving time point data and the temperature changing period is taken as the time point data of terminating the heat preservation. It is assumed that the serving time point is 18:30, the temperature changing period is 30 minutes, then the time point of terminating the heat preservation may be 18:00.

In step 207, the heat preservation for the food is initiated at a time point indicated by the time point data of initiating the heat preservation.

The heat preservation for the food is initiated at the time point data of initiating the heat preservation for the food determined in step 203. For example, if the determined time point data of initiating the heat preservation is 17:40, then the heat preservation is initiated at 17:40.

In step 208, the heat preservation for the food is terminated at a time point indicated by the time point data of terminating the heat preservation. For example, if the time point data of terminating the heat preservation for the food determined is 18:00, then the heat preservation for the food is terminated at 18:00.

In step 209, a temperature for the food is adjusted at the time point indicated by the time point data of terminating the heat preservation, such that the food is at the serving temperature at the time point indicated by the serving time point data after the temperature for the food is adjusted.

Different users may have different requirements for the serving temperature for the same food. For example, user A desires the rice to be served at 50 degrees Celsius, while user B desires the rice to be served at 70 degrees Celsius. In order to meet different requirements for the serving temperature for the food by different users, according to embodiments of the present disclosure, the temperature for the food is adjusted at the time point indicated by the time point data of terminating the heat preservation, such that the food is at a predetermined serving temperature at the time point indicated by the serving time point data after adjusted. The serving temperature for the food may be higher or lower than the holding temperature for the food. In the case that the serving temperature for the food is higher than the holding temperature for the food, the electronic cooker heats the food at the time point indicated by the time point data of terminating the heat preservation. In the case that the serving temperature for the food is lower than the holding temperature for the food, the electronic cooker cools the food at the time point indicated by the time point data of terminating the heat preservation.

FIG. 2-7 is an exemplary curve chart showing time point data and temperature data from cooking to serving for rice. In FIG. 2-7, t1 is a time point of terminating cooking for the rice, T1 is a temperature of terminating cooking at the time point of terminating cooking for the rice, t2 is a time point of initiating the heat preservation for the rice, T2 is the holding temperature for the rice at the time point of initiating the heat preservation, t3 is a time point of terminating the heat preservation for the food, T3 is a holding temperature for the rice at the time point of terminating the heat preservation, T2≈T3, t4 is the serving time point for the rice, T4 is the serving temperature for the rice at the serving time point, and T4<T3. Each time point and temperature in FIG. 2-7 may be calculated as follows.

Step 201 is executed to acquire the holding temperature data T2 (or T3) for the rice.

Step 202 is executed to acquire the time point data t1 of terminating cooking for the rice and the temperature data T1 of terminating cooking at the time point indicated by the time point data t1 of terminating cooking for the rice.

Step 203 is executed to: determine the time period from the time point indicated by the time point data t1 of terminating cooking for the rice to the time point indicated by the time point data t2 of initiating the heat preservation for the rice in accordance with the temperature data T1 of terminating cooking and the holding temperature data T2; and take a sum of the time point indicated by the time point data t1 of terminating cooking and the time period as the time point data t2 of initiating the heat preservation for the rice.

Step 204 is executed to predict the serving time point data t4 for the rice.

Step 205 is executed to acquire the serving temperature data T4 at the time point indicated by the serving time point data t4 for the rice.

Step 206 is executed to: determine the temperature changing period $\Delta t$ in accordance with the holding temperature data T2 (or T3), the serving temperature data T4, the environment temperature data T5, and the insulation parameter 2 of the inner tank of the electronic cooker; and take the difference between the serving time point data t4 and the temperature changing period $\Delta t$ as the time point data t3 of terminating the heat preservation for the rice.

Steps 207 to 209 are executed to: initiate the heat preservation for the rice at the time point indicted by the time point data T2 of initiating the heat preservation; terminate the heat preservation for the rice at the time point indicated by the time point data T3 of terminating the heat preservation; cool the rice at the time point indicated by the time point data T3 of terminating the heat preservation, so that the rice is at the serving temperature W4 at the time point indicated by the serving time point data T4.

So far, the rice may be at a serving temperature right desired by the user when the user arrives at the residence. The user does not have to wait for cooling or heating the rice prior to eating, thereby saving time for the user. It should be further noted that FIG. 2-7 merely shows the case that the rice is at the serving temperature lower than the holding temperature at the time point of terminating the heat preservation for the rice. However, embodiments of the present disclosure are also suitable to the case that the rice is at the serving temperature higher than the holding temperature at the time point of terminating the heat preservation for the rice.

It should be noted that a sequence of the steps in the method for controlling the heat preservation for the electronic cooker provided by embodiments of the present disclosure may be adjusted properly, and the steps may be added or cancelled accordingly as required. Any method which is apparent to those skilled in the art within the technical scope disclosed by the present disclosure may be covered within the protective scope of the present disclosure, which is not elaborated herein.

In the above-described method for controlling the heat preservation for the electronic cooker provided by embodiments of present disclosure, the time point data of terminating the heat preservation for the food is determined in accordance with the predicted serving time point data for the food, the serving temperature data, and the holding temperature data, such that the electronic cooker may be capable of determining the time point of terminating the heat preservation after finishing cooking, thereby enhancing flexibility in controlling the heat preservation as compared with the related art. In the related art, the flexibility in controlling the heat preservation is relative low, because the electronic cooker in the related art terminates the heat preservation for the food after a predetermined time period. As the temperature of the food gradually decreases after the heat preservation is terminated, an undesired serving temperature of a finally-obtained food for a user may be resulted after a predetermined time period after the electronic cooker in the related art terminates the heat preservation for the food. In contrast, by using the electronic cooker of the embodiments of the present disclosure, the user may directly eat the food right after arriving at the residence without waiting for cooling or heating, thereby saving time for the user.

The device embodiments of the present disclosure below may be used to perform the method embodiments of the present disclosure. Detailed description undisclosed in the device embodiments may refer to the method embodiments of the present disclosure.

FIG. 3-1 is a block diagram showing a device for controlling heat preservation for an electronic cooker according to an illustrative embodiment. The device for controlling the heat preservation for the electronic cooker may include a holding temperature predicting module 301, a serving time point predicting module 302, a serving temperature predicting module 303, a heat preservation terminating time point determining module 304, and a heat preservation terminating module 305.

The holding temperature predicting module 301 is configured to acquire holding temperature data for a food.

The serving time point predicting module 302 is configured to predict serving time point data for the food.

The serving temperature predicting module 303 is configured to acquire serving temperature data for the food at a time point indicated by the serving time point data.

The heat preservation terminating time point determining module 304 is configured to determine time point data of terminating heat preservation for the food in accordance with the serving time point data, the serving temperature data, and the holding temperature data.

The heat preservation terminating module 305 is configured to terminate the heat preservation for the food at a time point indicated by the time point data of terminating the heat preservation.

The above-described device for controlling the heat preservation for the electronic cooker provided by embodiments of present disclosure determines the time point data of terminating the heat preservation for the food in accordance with predicted serving time point data for the food, the serving temperature data and the holding temperature data, such that the electronic cooker may be capable of determining the time point of terminating the heat preservation after finishing cooking, thereby enhancing flexibility in controlling the heat preservation as compared with the related art.

In another embodiment, as shown in FIG. 3-2, the device for controlling the heat preservation for the electronic cooker may further include: a cooking acquiring module 306, a heat preservation initiating time point determining module 307, and a heat preservation initiating module 308.

The cooking acquiring module 306 is configured to acquire time point data of terminating cooking for the food and temperature data of terminating cooking for the food at a time point indicated by the time point data of terminating cooking.

The heat preservation initiating time point determining module 307 is configured to determine time point data of initiating the heat preservation for the food in accordance with the time point data of terminating cooking, the temperature data of terminating cooking and the holding temperature data.

The heat preservation initiating module 308 is configured to initiate the heat preservation for the food at a time point indicated by the time point data of initiating the heat preservation.

In one embodiment, as shown in FIG. 3-3, the device for controlling the heat preservation for the electronic cooker may further includes: a temperature adjusting module 309.

The temperature adjusting module 309 is configured to adjust a temperature for the food at the time point indicated by the time point data of terminating the heat preservation, such that the food is at the serving temperature at the time point indicated by the serving time point data after the temperature for the food is adjusted.

In one embodiment, the heat preservation terminating time point determining module 304 is further configured to: determine current environment temperature data; determine a temperature changing period in accordance with the holding temperature data, the serving temperature data, the environment temperature data, and an insulation parameter of an inner tank of the electronic cooker, the temperature changing period being a difference between the time point indicated by the serving time point data and the time point indicated by the time point data of terminating the heat preservation; and determine the time point data of terminating the heat preservation in accordance with the temperature changing period and the serving time point data.

In one embodiment, the serving time point predicting module 302 is configured to predict the serving time point data in accordance with information on a historical serving record comprising a time point of opening the electronic cooker after each time point of terminating cooking recorded in advance.

In one embodiment, the serving time point predicting module 302 is configured to take a time point in a current date that that corresponds to the time point of opening the electronic cooker after the last time point of terminating cooking as the serving time point data.

In one embodiment, as shown in FIG. 3-4, the serving time point predicting module 302 includes: a route acquiring sub-module 3021 configured to acquire information on a route along which a user travels back to a residence; a transportation mode acquiring sub-module 3022 configured to acquire information on a transportation mode by which the user travels back to the residence; a traffic condition acquiring sub-module 3023 configured to acquire information on a traffic condition of the route along which the user travels back to the residence; an arriving time point predicting sub-module 3024 configured to predict time point data when the user arrives at the residence in accordance with the information on the transportation mode and the information on the traffic condition; and a serving time point determining sub-module 3025, configured to take the time point data when the user arrives at the residence as the serving time point data.

In one embodiment, the route acquiring sub-module 3021 is configured to: receive information on a current position of the user sent from a terminal; acquire information on a position of the residence of the user, the residence being a place where the electronic cooker is located; and determine the information on the route along which the user travels back to the residence in accordance with the information on the current position of the user and the information on the position of the residence of the user.

In one embodiment, the serving temperature predicting module 303 is configured to take serving temperature data for the food at a time point of opening the electronic cooker after the last time point of terminating cooking 1 as the serving temperature data. In one embodiment, the serving temperature predicting module 303 is configured to take present recommended temperature data for the food as the serving temperature data. In one embodiment, the serving temperature predicting module 303 is configured to inquire a preset correspondence between age ranges and temperatures in accordance with an age range to which the user belongs to obtain temperature data corresponding to the age range to which the user belongs, and determine the temperature data corresponding to the age range to which the user belongs as the serving temperature data.

In one embodiment, the holding temperature predicting module 301 is configured to: receive a name inputting instruction for indicating a food name; determine target holding temperature data corresponding to the food name indicated by the name inputting instruction in accordance with the name inputting instruction and a preset holding temperature correspondence between the food names and the holding temperatures for the food; and take the target holding temperature data as the serving temperature data.

The above-described device for controlling the heat preservation for the electronic cooker provided by embodiments of the present disclosure determines the time point data of terminating the heat preservation for the food in accordance with predicted serving time point data for the food, the serving temperature data, and the holding temperature data, such that the electronic cooker may be capable of determining the time point of terminating the heat preservation after finishing cooking, thereby enhancing flexibility in controlling the heat preservation as compared with the related art. As a result, the user may directly eat the food right after arriving at the residence without waiting for cooling or heating, thereby saving time for the user.

With respect to the devices in the above embodiments, the specific manners for performing operations for individual modules therein have been described in detail in the embodiments regarding the methods for controlling the heat preservation for the electronic cooker, which will not be elaborated herein.

FIG. 4 is a block diagram of a device 400 for controlling heat preservation for an electronic cooker, according to an exemplary embodiment. For example, the device 400 may be used in the electronic cooker. Referring to FIG. 4, the device 400 includes a processor 402 and a memory 404 for storing instructions executable by the processor 402. The processor 402 is configured to perform the above described methods for recording exercise.

In illustrative embodiments, there is also provided a non-transitory computer-readable storage medium including instructions, such as included in the memory 404, executable by the processor 402 in the device 400, for performing the above-described methods. For example, the non-transitory computer-readable storage medium may be a read-only memory (ROM), a random access memory (RAM), a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling heat preservation for an electronic cooker, wherein the electronic cooker includes a processor, and the method is performed by the processor and comprises:
    acquiring holding temperature data for a food;
    predicting serving time point data for the food;
    acquiring serving temperature data for the food at a time point indicated by the serving time point data;
    determining current environment temperature data;
    determining a temperature changing period in accordance with the holding temperature data, the serving temperature data, the environment temperature data, and an insulation parameter of an inner tank of the electronic cooker, the temperature changing period being a difference between the time point indicated by the serving time point data and a time point indicated by time point data of terminating the heat preservation;
    determining the time point data of terminating the heat preservation in accordance with the temperature changing period and the serving time point data; and
    terminating the heat preservation for the food at a time point indicated by the time point data of terminating the heat preservation.

2. The method according to claim 1, further comprising:
    acquiring time point data of terminating cooking for the food and temperature data of terminating cooking for the food at a time point indicated by the time point data of terminating cooking;
    determining time point data of initiating the heat preservation for the food in accordance with the time point data of terminating cooking, the temperature data of terminating cooking, and the holding temperature data; and
    initiating the heat preservation for the food at a time point indicated by the time point data of initiating the heat preservation.

3. The method according to claim 1, further comprising:
adjusting a temperature for the food at the time point indicated by the time point data of terminating the heat preservation, such that the food is at the serving temperature at the time point indicated by the serving time point data after the temperature for the food is adjusted.

4. The method according to claim 1, wherein predicting the serving time point data for the food comprises at least one of:
predicting the serving time point data in accordance with information on a historical serving record comprising a time point of opening the electronic cooker after each time point of terminating cooking recorded in advance; or
taking a time point in a current date that corresponds to the time point of opening the electronic cooker after the last time point of terminating cooking as the serving time point data.

5. The method according to claim 1, wherein predicting the serving time point data for the food comprises:
acquiring information on a route along which a user travels back to a residence;
acquiring information on a transportation mode by which the user travels back to the residence;
acquiring information on a traffic condition of the route along which the user travels back to the residence;
predicting time point data when the user arrives at the residence in accordance with the information on the transportation mode and the information on the traffic condition; and
taking the time point data when the user arrives at the residence as the serving time point data.

6. The method according to claim 5, wherein acquiring the information on the route along which the user travels back to the residence comprises:
receiving information on a current position of the user sent from a terminal;
acquiring information on a position of the residence of the user, the residence being a place where the electronic cooker is located; and
determining the information on the route along which the user travels back to the residence in accordance with the information on the current position of the user and the information on the position of the residence of the user.

7. The method according to claim 1, wherein acquiring the serving temperature data for the food at the time point indicated by the serving time point data comprises at least one of:
taking serving temperature data for the food at a time point of opening the electronic cooker after the last time point of terminating cooking as the serving temperature data;
taking preset recommended temperature data for the food as the serving temperature data; or
inquiring a preset correspondence between age ranges and temperatures in accordance with an age range to which the user belongs to obtain temperature data corresponding to the age range to which the user belongs, and determining the temperature data corresponding to the age range to which the user belongs as the serving temperature data.

8. The method according to claim 1, wherein acquiring the holding temperature data for the food comprises:
receiving a name inputting instruction for indicating a food name;
determining target holding temperature data corresponding to the food name indicated by the name inputting instruction in accordance with the name inputting instruction and a preset holding temperature correspondence between food names and holding temperatures for the foods; and
taking the target holding temperature data as the holding temperature data.

\* \* \* \* \*